US006619063B1

(12) United States Patent
Brumett

(10) Patent No.: US 6,619,063 B1
(45) Date of Patent: Sep. 16, 2003

(54) INDOOR AIR TREATMENT SYSTEM WITH HEPA FILTRATION

(76) Inventor: Anthony Lee Brumett, 2400 Wayside Dr., Washington, IN (US) 47501

(*) Notice: Subject to any disclaimer, the term of this patent is extended or adjusted under 35 U.S.C. 154(b) by 0 days.

(21) Appl. No.: 10/102,184

(22) Filed: Mar. 19, 2002

(51) Int. Cl.[7] .................. F25D 23/00; F25D 23/12; F25D 17/04; F25D 17/06
(52) U.S. Cl. .................. 62/264; 62/259.1; 62/410; 62/411; 62/428
(58) Field of Search .................. 62/264, 259.1, 62/410, 411, 428

(56) References Cited

U.S. PATENT DOCUMENTS

| 2,363,839 | A | | 11/1944 | Demuth |
| 2,788,648 | A | | 4/1957 | Sherron |
| 2,813,406 | A | | 11/1957 | Smith |
| 3,415,073 | A | | 12/1968 | Ammons |
| 5,193,610 | A | * | 3/1993 | Morissette et al. ........... 165/54 |
| 5,401,212 | A | | 3/1995 | Marvell et al. |
| 5,505,046 | A | * | 4/1996 | Nelson et al. ................ 62/3.6 |
| 5,884,500 | A | | 3/1999 | Wetzel |
| 5,987,908 | A | | 11/1999 | Wetzel |
| 6,209,622 | B1 | * | 4/2001 | Lagace et al. ................. 165/8 |
| 6,347,527 | B1 | * | 2/2002 | Bailey et al. .............. 62/238.7 |
| 6,385,985 | B1 | * | 5/2002 | Bussjager et al. ......... 62/259.1 |

OTHER PUBLICATIONS

Carrier® Heat Recovery Ventilator, HRV Comfort Ventilator. Indoor Air Quality, product literature. ©Carrier Corporation 2001. 08VA–3B1 Rev. 8/01.

Klenck, Thomas, "Heat–Recovery Ventilator" *Popular Mechanics*. poularmechanics.com/home... pp. 1–4.

The Ultra–Aire APD Air Purfiying Dehumidifier, Model UA–150H, product literature: Installation Recommendations and Options. Distributor: Therma–Stor Products, Madison, WI. DEC International. www.thermastor.com.

Arzel® Zoning Technology, Product Catalog. ©Copyright Arzel 2001 (Rev. May 16, 2001). www.arzelzoning.com.

AZR Automatic Zone Register™, product literature. Jackson systems, LLC. Jul. 31, 2001. www.jacksonsystems.com.

Stakes, Valerie, "Creature Comfort," *Contracting Business*, Jul., 2000. Pp42–45.

* cited by examiner

Primary Examiner—William C. Doerrler
Assistant Examiner—Filip Zec
(74) Attorney, Agent, or Firm—Woodard, Emhardt, Moriarty, McNett & Henry LLP

(57) ABSTRACT

An air treatment system includes a housing that defines an interior cavity. The interior cavity has a supply-air flow path and a stale-air flow path. A HEPA filter is positioned along the supply-air flow path to filter supply air. A heat recovery core is positioned downstream from the HEPA filter along the supply-air flow path. The heat recovery core is positioned between the supply-air flow path and the stale-air flow path to exchange heat between the supply air and stale air. An evaporator is positioned downstream from the heat recovery core along the supply-air flow path to remove heat from the supply air. An ultraviolet light is positioned downstream from the evaporator along the supply-air flow path to irradiate the supply air with ultraviolet light. A condenser is positioned downstream from the ultraviolet light to reintroduce the heat removed from the supply air by the evaporator.

25 Claims, 9 Drawing Sheets

INDOOR AIR TREATMENT SYSTEM WITH HEPA FILTRATION

BACKGROUND OF THE INVENTION

The present invention generally relates to indoor air treatment systems, and more specifically, but not exclusively, concerns a mechanical and natural process dehumidifier with a compact construction that incorporates a heat recovery ventilation system that utilizes a high efficiency particulate air (HEPA) filter and an ultra-violet sanitation system.

Indoor air quality has become an increasing concern for new and newly remodeled home owners. Newer model homes over the past couple of decades have become more energy efficient and practically airtight.

Life inside today's airtight homes generates both moisture and pollutants. Maintaining an ideal humidity in the home can be needed for optimum health. In order to create a comfortable living space, the humidity level in a home should be approximately 40–55%. When humidity levels are less than 40% or more than 60%, pollutant levels rise dramatically. This will cause bacteria, viruses, fungi, mites, respirator infections, allergic rhinitis and asthma, chemical interactions, and ozone production. With today's tighter homes, too much humidity during all seasons can be problematic. For example, excessive moisture can cause the sweating/water drops to develop on windows and doorjambs. This condition is a major health concern and can prematurely deteriorate the windows and doorjambs. Areas of excessive moisture are also breeding grounds for mold, mildew, fungi, dust mites and bacteria. For example, black spots may form on the walls of humid homes, which indicate mildew growth. Mold spores and dust easily become airborne and circulate freely throughout the house, possibly causing a range of illnesses and allergic reactions.

In addition to excessive moisture and biological contaminants, appliances that utilize combustion have the potential for allowing gases such as carbon monoxide and other pollutants, to escape into the air. Some common sources may include gas ranges, water heaters, unvented space heaters, leaky chimneys, and wood burning appliances. Today's homes have such high levels of negative pressure (because of exhausting appliances and fans in the home), that even a perfectly good chimney or appliance can be back drafted. Even breathing can add to the problem when carbon dioxide reaches excessive levels. Most building materials used today are treated with many harmful toxins that produce off gases that slowly leak into the home for many years. In addition, household cleaning products can generate large amounts of pollutants, and there is also a concern about radon seeping from the ground which may cause some health problems.

In a poor attempt to alleviate these problems, ventilation fans have been installed into rooms of homes, such as bathrooms, in order to draw stale air containing moisture and/or pollutants out of the home. However, operating such a fan reduces the overall energy efficiency and creates a severe negative pressure within the home. For instance, with an average run time of 20 minutes for a bathroom fan, approximately 2000 cubic feet of air is drawn out of the house. Replacement air is air drawn from outside the house and is unconditioned and unfiltered. This replacement air comes from the paths of least resistance, such as leaky doors and windows, chimneys, water heater vents, gas appliance vents, and attached garage. The replacement air must then be heated or cooled in order to match the inside air temperature. Further, this replacement air can worsen the air quality inside the home. During operation of the ventilation fan, when the humidity outside is greater than the inside humidity, humidity levels inside the home may in fact be increased to an uncomfortable level.

Portable air filters have been used to remove particulates, such as pollen and mold, from the air. While some of these portable filters advertise that they use a "HEPA filter", in reality these filters are not true HEPA filters because they are not large enough to be at least 99.97% efficient in removing particles of at least 0.3 microns in diameter. With these types of inefficient filters, pollutants such as smoke, dust and bacteria can remain in the air. Another problem faced with portable air filtration systems is that such systems can only clean the air in limited areas of a house.

Therefore, there has been a need for an energy efficient, home air handling system that can be easily installed and that can maintain the relative humidity of a home at a comfortable level while at the same time, reducing the amount of pollutants in the air.

SUMMARY OF THE INVENTION

One form of the present invention concerns a unique air treatment system. The system includes a housing that defines an interior cavity. The interior cavity has a supply-air flow path and a stale-air flow path. A HEPA filter is positioned in the interior cavity of the housing along the supply-air flow path in order to filter supply air. A heat recovery core is positioned downstream from the HEPA filter along the supply-air flow path. The heat recovery core is positioned in the interior cavity between the supply-air flow path and the stale-air flow path to exchange heat between the supply air and stale air. An evaporator is positioned downstream from the heat recovery core along the supply-air flow path to remove heat from the supply air. An ultraviolet light is positioned downstream from the evaporator along the supply-air flow path to irradiate the supply air with ultraviolet light. A condenser is positioned downstream from the ultraviolet light along the supply-air flow path to reintroduce the heat removed from the supply air by the evaporator.

Another form of the present invention concerns a unique air treatment system. The system includes a housing that defines an interior cavity. The interior cavity has a supply-air flow path and a stale-air flow path. The housing includes a stale air chase for supplying stale air to the stale-air flow path and a tempered air chase for exhausting supply air from the supply-air flow path. The stale air chase and the tempered chase parallelly extend the entire length of one side of the housing. The housing defines a fresh air intake and a recirculation air intake. A baffle is provided along the supply-air flow path in the housing, and the baffle is positionable to alternately close the fresh air intake and the recirculation air intake. A charcoal filter is positioned downstream from the fresh air intake and the recirculation air intake along the supply-air flow path in the interior cavity to filter the supply air. A high efficiency particulate air filter is positioned downstream from the charcoal filter along the supply-air flow path to filter the supply air. A heat recovery core is positioned downstream from the high efficiency particulate air filter along the supply-air flow path. The heat recovery core is positioned between the supply-air flow path and the stale air flow path to exchange heat between the supply air and the stale air. An evaporator is positioned downstream from the heat recovery core along the supply-air flow path to cool the supply air. A drain pan is positioned in the interior cavity to collect condensation from the evaporator. An ultraviolet light is positioned downstream from the evaporator along the supply-air flow path to irradiate the supply air with ultraviolet light. A condenser is positioned downstream from the ultraviolet light along the supply-air flow path to heat the supply air. A supply air fan is positioned downstream from the condenser along the supply-air flow path to exhaust the supply air into the tempered chase. A stale air fan is positioned downstream from the heat recovery core along the stale air flow path to move the stale air. A compressor is positioned in the interior cavity of the housing, and the compressor is operatively coupled to the evaporator and the condenser. An electrical panel positioned in the housing to supply electricity to the system.

DESCRIPTION OF THE PREFERRED EMBODIMENTS

Figure 1:
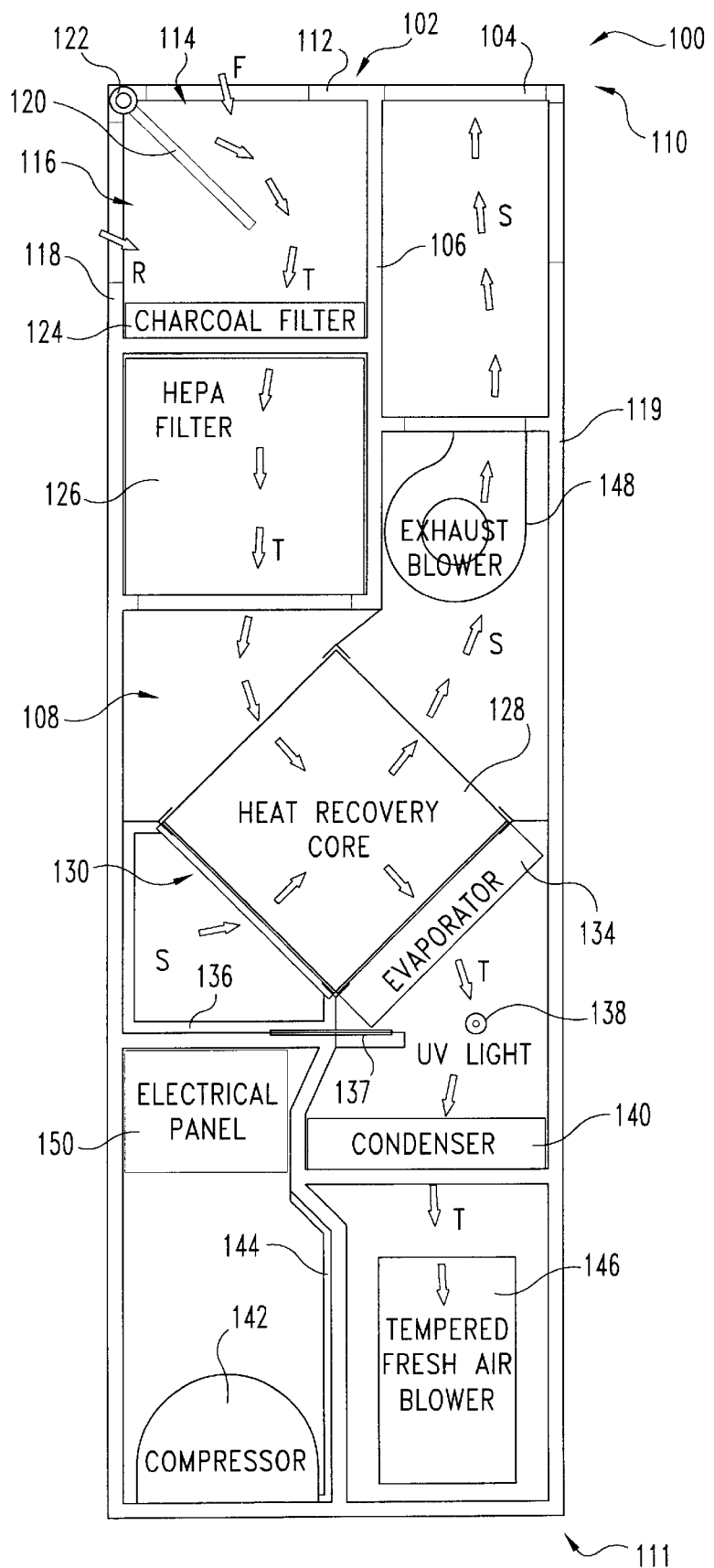
FIG. 1 is a front, cross-sectional view of an air treatment unit according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
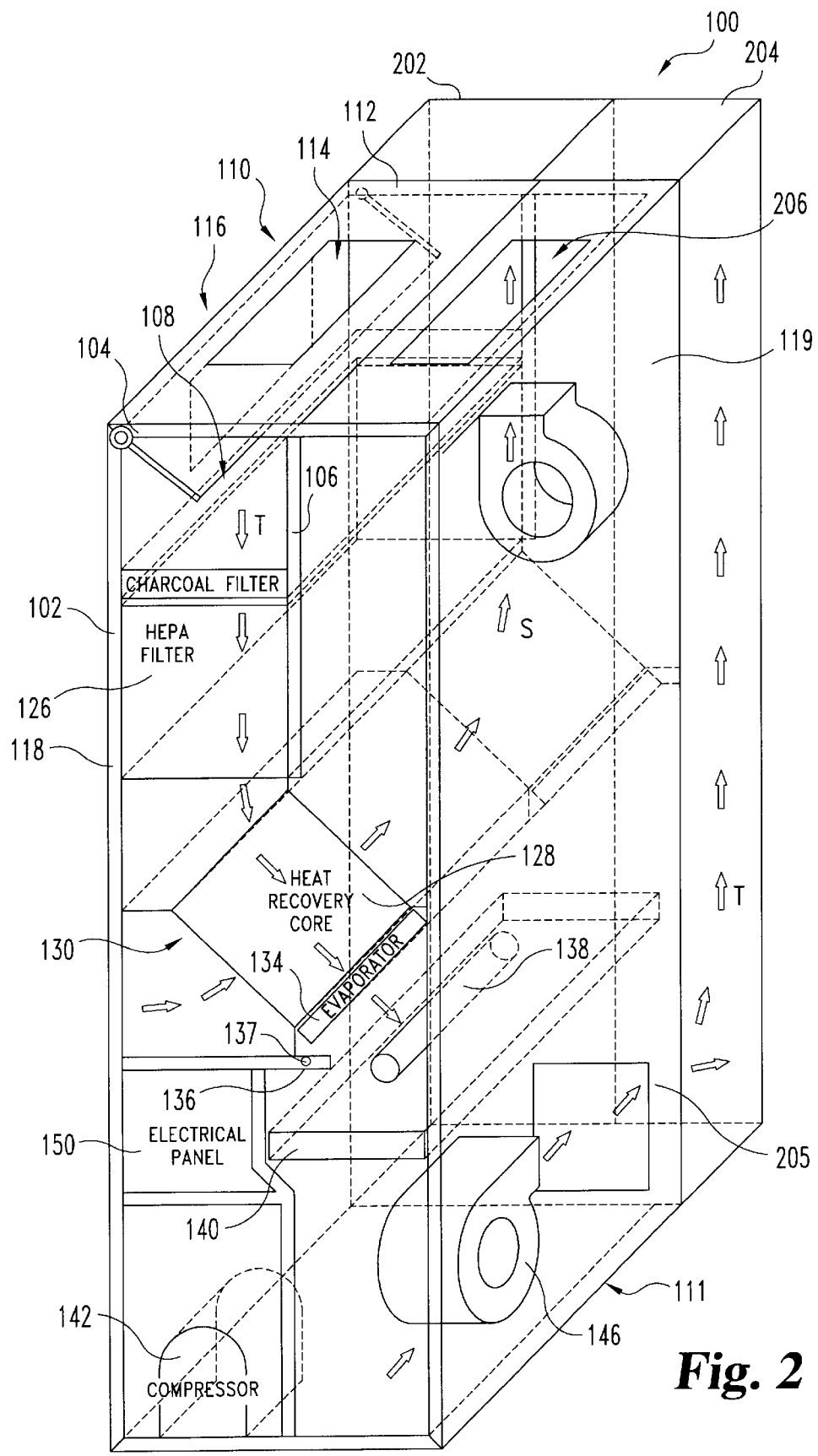
FIG. 2 shows a perspective view of the FIG. 1 system.

As shown in FIGS. 1–2, an air treatment unit 100 according to one embodiment (among others) of the present invention includes a number of air treatment components housed in a single unit. The unit 100 includes a housing 102 for enclosing and supporting the various components. The housing 102 has a compact, rectangular crosssectional shape such that the unit 100 can be easily installed in diverse operational environments, such as basements, crawl spaces and attics. The housing 102 includes an outer shell 104 and inner support walls 106 that separate various inner cavities 108. As shown in FIG. 1, the housing 102 has a generally rectangular shape with a first end 110 and a second end 111. At the first end 110 of the housing 102, a first end wall 112 defines a fresh air passageway 114 through which fresh air is introduced to the unit 100. A recirculation air passageway 116 is defined in a first side wall 118 of the housing 102 that is adjacent to the first end wall 112 and opposite a second side wall 119. As should be appreciated, the positions of the fresh air passageway 114 and the recirculation air passageway 116 can be swapped such that the first end wall 112 defines the recirculation air passageway 116 and the first side wall 118 defines the fresh air passageway 114.

In the housing 102, the unit 100 has a baffle 120 that is pivotally attached to an electric motor 122 for alternately closing the fresh air passageway 114 and the recirculation air passageway 116. The fresh air and recirculated air can be mixed or alternately selected by the baffle 120 to form supply air for the unit 100. As should be appreciated, the baffle 102 can be actuated with other types of mechanisms, such as by using mechanical linkages, pneumatic motors, and hydraulic motors, to name a few. Downstream from the baffle 120, the unit 100 includes a charcoal filter 124 for removing carbon-based chemicals from the air, such as noxious gases. The unit 100 further includes a HEPA filter 126, which is located downstream from the charcoal filter 124. The HEPA filter 126, according to the present invention, is a "true" HEPA filter that is able to filter particles 0.3 microns in diameter with at least 99.97% efficiency. When describing the present invention, "HEPA filter" is defined as a filter that is able to filter particulates at least 0.3 microns in diameter with at least 99.97% efficiency. This definition should not be confused with alleged "HEPA filters" that do not filter with such efficiency. Build up of contaminants in the unit 100 can disrupt air circulation and reduce the operational efficiency of the unit 100. Having the charcoal filter 124 and the HEPA filter 126 located upstream from the remaining components of the unit 100, reduces the amount of particulates that can contaminate the rest of the unit 100.

Figure 3:
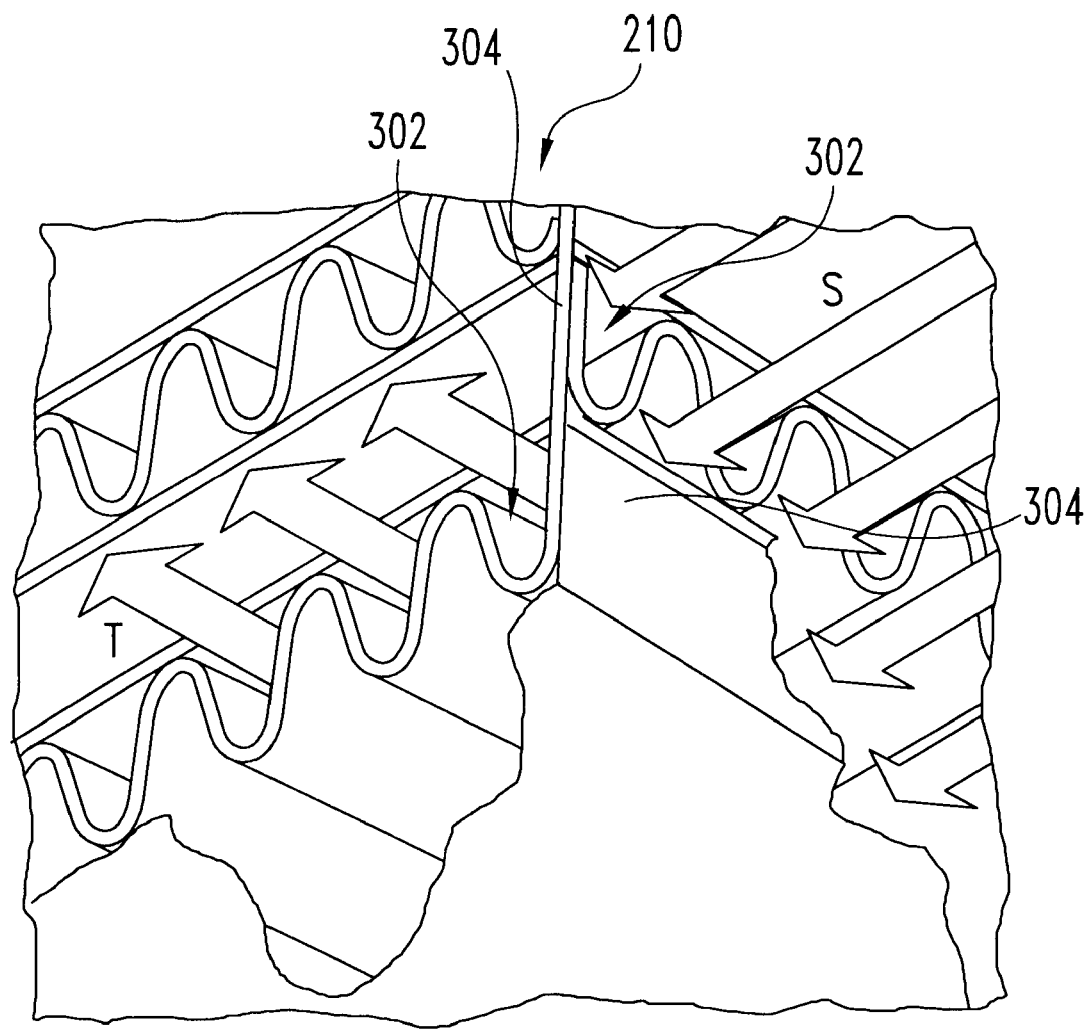
FIG. 3 shows a fragmentary cutaway view of a heat recovery core used in the FIG. 1 unit.

To improve energy efficiency, the unit 100 includes a heat recovery core 128, which transfers heat between the supply air and stale air in the home such that that supply air is heated or cooled to match the building air temperature. As shown, the heat recovery core 128 is oriented at an angle relative to the side walls 118, 119. In the illustrated embodiment, the heat recovery core 128 is an air to air heat exchanger. The housing 102 defines a stale air inlet port 130 through which the stale air from the house is supplied to the unit 100. The heat recovery core 128 exchanges energy between the stale air from the stale air inlet port 130 and the air from the HEPA filter 126. A magnified view of an example of the heat recovery core 128 is illustrated in FIG. 3. As shown, the heat recovery core 128 includes pairs of alternating air channels 302. Conductive walls 304 of the channels 302 conduct the heat between the two different airflows. In one embodiment, the walls 304 are made of aluminum. As should be appreciated, the heat recovery core 128 can be made of different material and/or the walls 304 can be constructed in other manners than the one shown.

Referring again to FIGS. 1–2, downstream from the heat recovery core 128, the unit 100 has an evaporator 134, which is used to cool the in-flowing supply air and reduce the humidity in the supply air. As shown, the evaporator 134 is positioned at an angle to match the orientation of the heat recovery core 128. The evaporator 134 cools the air in order to reduce the humidity of the air. By angling the evaporator 134, any condensation formed on the evaporator can run into a drip pan 136. A drain 137 is formed in the pan 136 so that the collected water can be removed from the unit 100.

An ultraviolet (UV) light 138 is positioned between the evaporator 134 and a condenser 140 in order to irradiate the cooled, dehumidified supply air from the evaporator 134. The UV light 138 destroys bio-aerosols, such as bacteria, mold, mildew and toxins that can be found in the air. Due to the presence of water, organisms can grow in the area around the evaporator 134 and the condenser 140. The UV light 138 is positioned to destroy these organism on the evaporator 134 and the condenser 140. Further, positioning the UV light 138 downstream from the evaporator 134 cools the UV light 138, which can extend the operational life of the UV light 138. The heat removed by the evaporator 134 is reintroduced into the air through the condenser 140, which is located downstream from the evaporator 134 and the UV light 138. The condenser 140 and the evaporator 134 form a heating/cooling circuit with a compressor 142 through tubing 144. As should be appreciated, auxiliary evaporators and/or condensers, which are coupled to the compressor 142, can be positioned outside the housing 102. Blowers 146, 148 circulate air through the unit 100. Located at the second end 111 of the unit 100, the tempered air blower 146 draws the air from the condenser 140. Exhaust blower 148, which is located downstream from the heat recovery core 128, draws the stale air across the heat recovery core 128. Electric panel 150 which is located above compressor 142 contains the electrical controls and other electrical components that are used to operate the unit 100, such as the UV light 138, the electric motor 122, the compressor 142, and the blower fans 146, 148.

As shown in FIG. 2, the housing 102 includes a pair of chases 202, 204 that extend from the first end 110 to the second end 111 of the unit 100. The stale air chase 202 supplies the stale air to the heat recovery core 128 through the stale air inlet port 130. The tempered air chase 204 receives tempered air from the tempered air blower 146 through a tempered-air port 205 formed in the housing 102. By parallelly extending the entire length of the housing 102, the chases 202, 204 can be retrofitted to numerous types of household installations. Ductwork connections can be formed at any position along the entire length of the chases 202, 204 by simply cutting an opening for the ductwork in the chases 202, 204. The housing 102 at first end 112 defines a stale air exhaust port 206 through which the stale air is exhausted from the unit 100 during operation. It should be appreciated that the stale air exhaust port 206 can also be formed in the second side wall 119.

Figure 4:
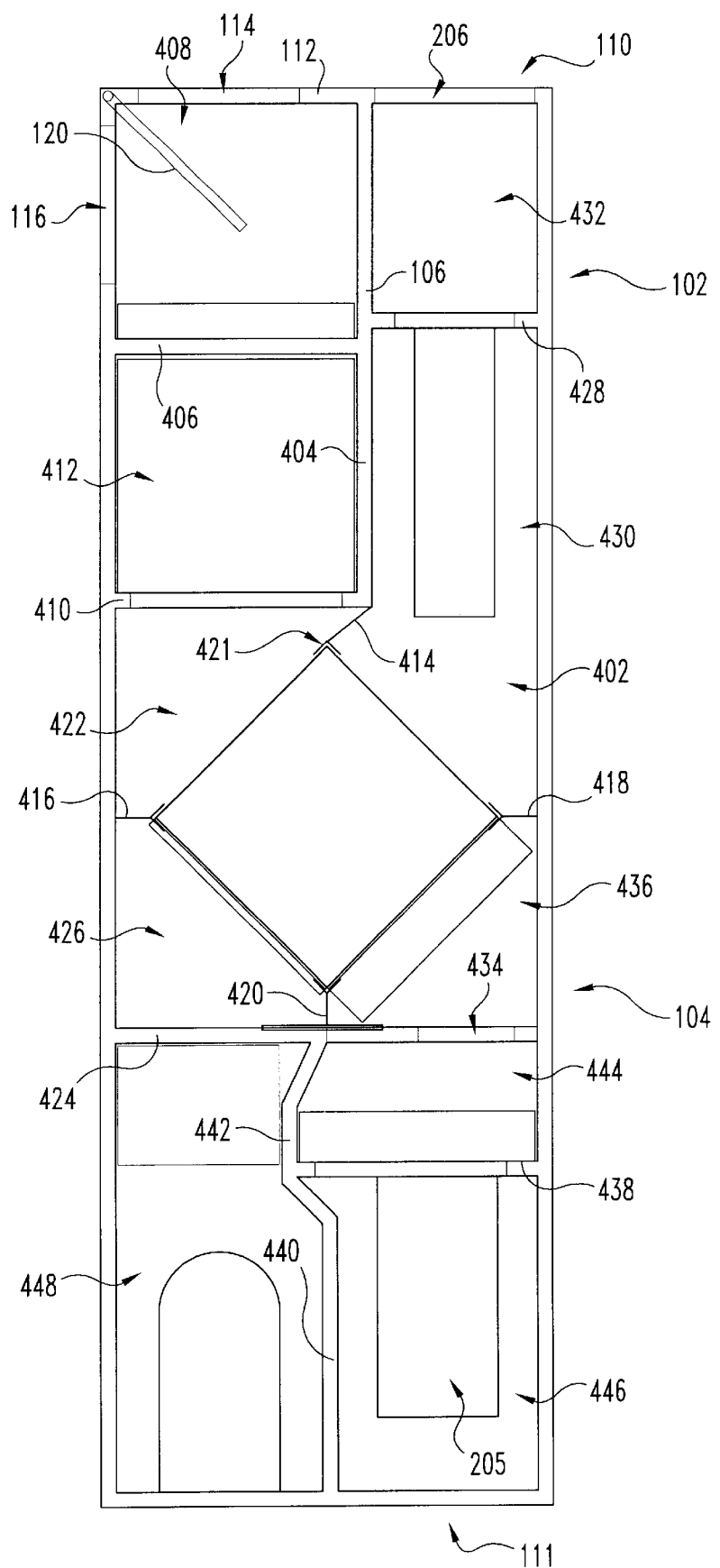
FIG. 4 shows a front sectional view of the housing for the FIG. 1 unit.
Figure 5:
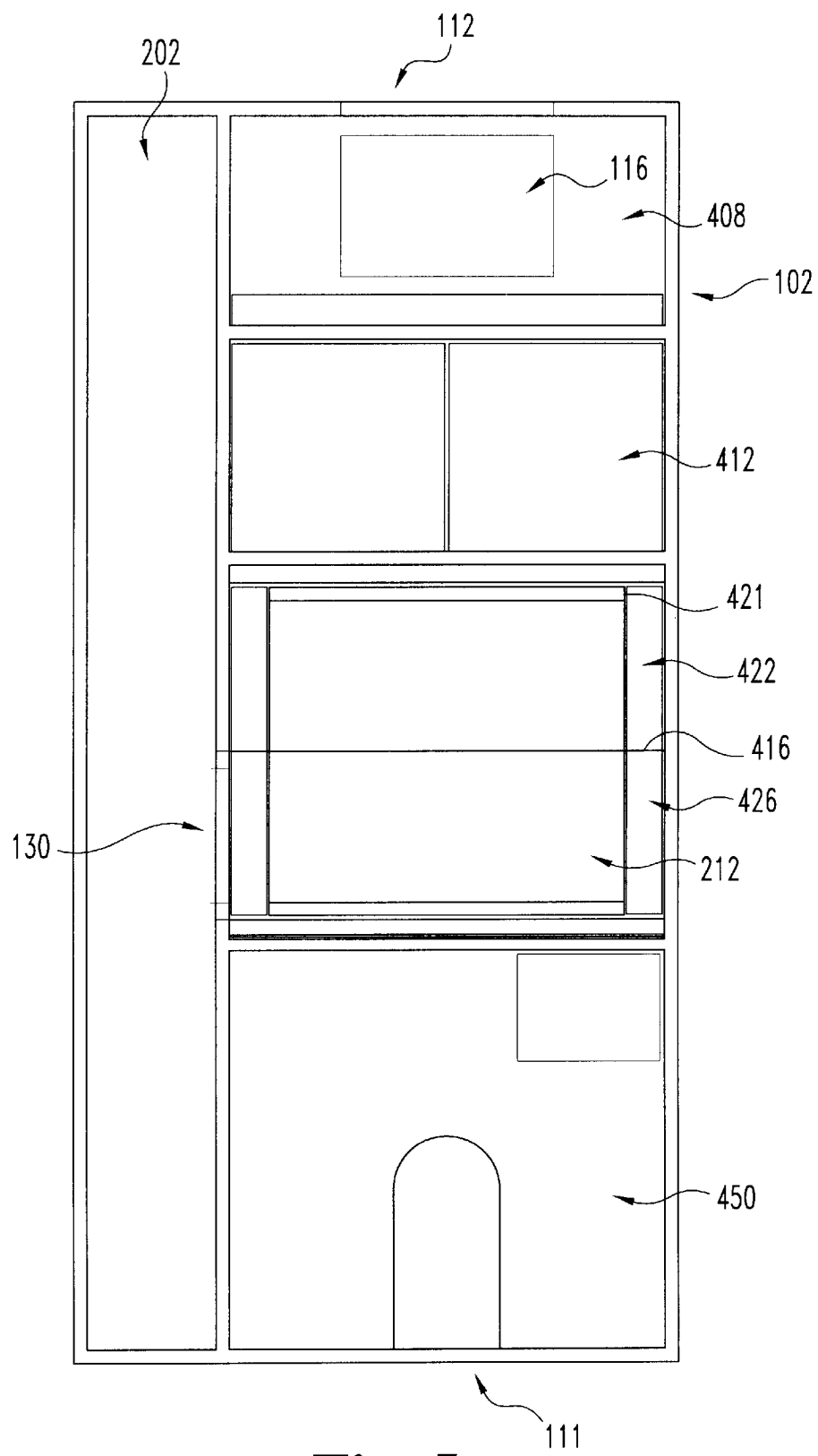
FIG. 5 shows a first sectional side view of the FIG. 4 housing.
Figure 6:
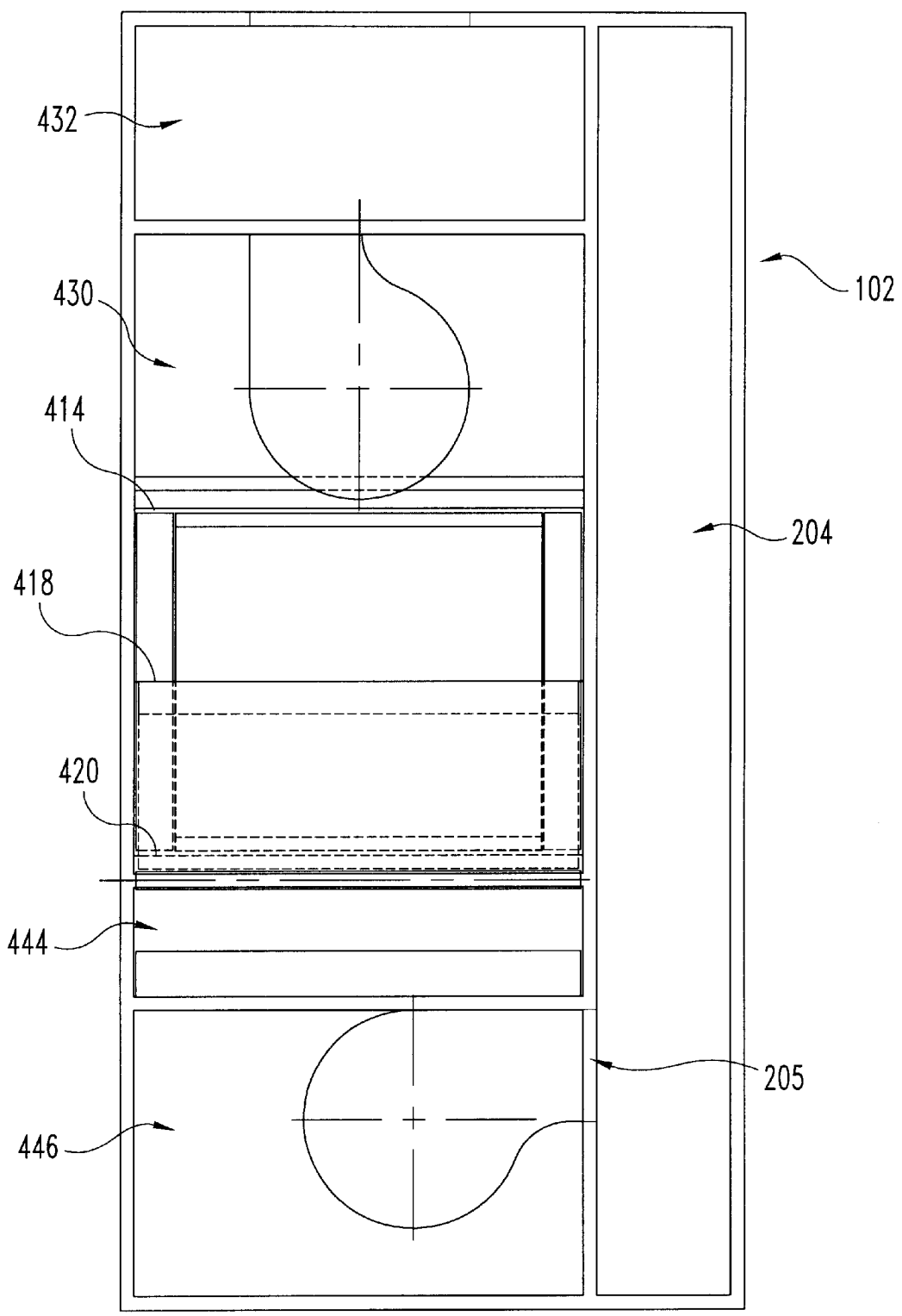
FIG. 6 shows a second sectional side view of the FIG. 4 housing.
Figure 7:
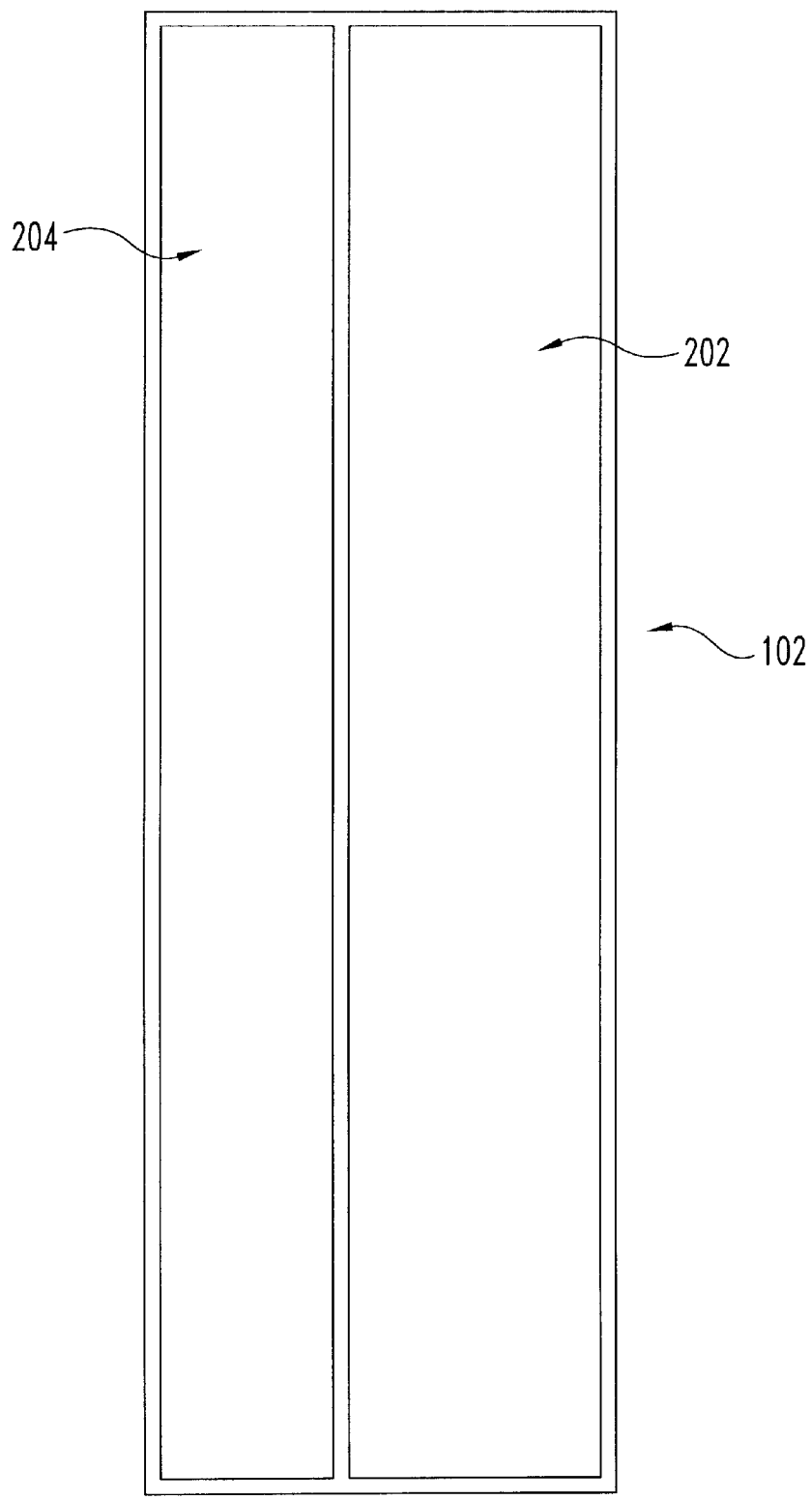
FIG. 7 shows a rear sectional view of the FIG. 4 housing.

Details of the housing 102, which is used to support the various components of the unit 100, are illustrated in FIGS. 4–7. As should be appreciated the construction of the housing 102 allows for the unit 100 to have a compact construction along with flexibility in attaching ductwork to the unit 100. The housing 102 has walls 104, 106 that define the various cavities 108 (FIG. 2) in which the components of the unit 100 are positioned. As illustrated in FIG. 4, a central wall 404 along with a charcoal filter support ridge 406 define a baffle cavity 408 in which the baffle 120 is able to pivot. The charcoal filter support ridge 406, which is located opposite the first end wall 112, supports the charcoal filter 124. Together, the charcoal filter support ridge 406, the first side wall 118, the central wall 404 and a HEPA filter support ridge 410 define a HEPA filter cavity 412 in which the HEPA filter 126 is slidably positioned. For periodic replacement, the HEPA filter 126 can be slidably removed from the HEPA filter cavity 412.

Below the HEPA filter 126, the heat recovery core 128 is supported by four core support walls 414, 416, 418 and 420. Each of the core support walls 414, 416, 418 and 420 has angled bracket members 421 that support the corners of the heat recovery core 128. The upper core support wall 414, along with the lateral upstream core support wall 416 and the outer shell 104 define a filtered air cavity 422 between the HEPA filter cavity 412 and the heat recovery core 128. The lateral upstream core support wall 416, the outer shell 104, the lower core support wall 420 and a drip pan support wall 424 all define a stale air inlet cavity 426 in which stale air from the stale air chase 202 is introduced. The upper core support wall 414, the lateral downstream core support wall 418, the central wall 404, the outer shell wall 104, a blower fan support ridge 428, define a stale air, blower fan exhaust cavity 430 in which the stale air blower fan 148 is secured. The outer shell wall 104, central wall 404, and the blower fan support ridge 428 define a stale air exhaust port cavity 432. Stale air from the exhaust port cavity 432 is exhausted out the stale air exhaust port 206.

Downstream from the heat recovery core 128, the drip pan support wall 424 defines a UV light support passageway 434 in which the UV light 138 is secured. The outer wall 104 along with the lateral, downstream core support wall 418, and the lower core support wall 420 define an evaporator cavity 436 in which the evaporator 134 is located. The evaporator 134 can be secured either to the heat recovery core 128 directly or to the angled brackets 421 of the support walls 418, 420. Below the condenser 140, a condenser support ridge 438 supports the condenser 140 while allowing air to pass therethrough. Near the lower end 111 of the housing 102, the unit 100 has a lower central wall 440 with a bowed portion 442 that accommodates the condenser 140. The bowed portion 442 of the lower central wall 440 along with the condenser support ridge 438 define a condenser cavity 444. Below the condenser cavity 444, the lower central wall 440 along with the outer wall 104 define a blower cavity 446 in which the tempered air blower 146 is secured. The blower cavity 446 communicates with the tempered air chase 204 through the tempered-air port 205. At lower end portion 111 of the housing 102 and adjacent the blower cavity 446, the drip pan support wall 424, the lower central wall 440 and the outer shell 104 define a compressor/electrical panel cavity 448. The compressor 142 along with the electrical panel 150 are housed within the compressor/electrical panel cavity 448 so as to be isolated from the various air flow paths.

The operation of the unit 100 will now be described with reference to FIGS. 1 and 2. Generally, during operation, the unit 100 both cleans and dehumidifies the air supplied to a home. As illustrated, the fresh air flows along fresh air flow path F, recirculation air flows along a recirculation flow path R and the stale air flows along stale air flow path S. The fresh air flow path F and/or the recirculated air flow path R can form a supply air flow path T through the unit 100. For example, when the unit 100 is operating in a fresh air mode or when a bathroom exhaust fan is activated, the damper 120 will shift to block the recirculation air passageway 116. This fresh air mode is used any time that a lot of fresh air is required in a home, for instance, during vacuuming, dusting, cooking, or removal of cigarette smoke. As shown by the supply air flow path T, the fresh air flows through the activated charcoal filter 124 to remove carbon based chemicals (VOCs) in order to help reduce odors. The fresh air then passes through the HEPA filter 126 in order to remove particulates down to 0.3 microns in size. The HEPA filter 126 blocks pollens, molds and other types of contaminants from entering the home through the unit 100. The filtering by the HEPA filter 126 also helps to keep the downstream components of the unit 100 relatively clean. The filtered fresh air from the HEPA filter 126 then flows through the heat recovery core 128. In one example, the heat recovery core 128 is a matrix of aluminum plates that allow energy from the stale air to pass to the fresh air. This minimizes energy consumption while maximizing efficiency. Stale air, for example from a bathroom exhaust fan, is supplied to the unit 100 through stale air chase 202. The stale air is exhausted from the stale air exhaust port 206 to a duct that eventually exhausts the stale air to the outside. The amount of stale air exhausted is in proportion to the amount of fresh air supplied to the system such that neutral pressure is created in the house. By having neutral pressure in the home, drafts and outside infiltration is reduced. When a house has negative pressure, outdoor pollutants are drawn through chimneys, flues and cracks in the walls.

After passing through the heat recovery core 128, the fresh air then flows through the evaporator 134. In one form, the unit operates the evaporator 134 when the incoming air is above 50% relative humidity. The evaporator coil 134 cools the air in order to reduce the air's humidity. The moisture collected runs down the evaporator 134, into the drip pan 136 and eventually out the drain 137. The cooled air then is irradiated with UV light from the UV light 138 to destroy any type of organism in the air. After the air is irradiated by the UV light 138, the air then passes through condenser 140, which reintroduces the heat removed by the evaporator 134. The now tempered air flow is blown by tempered air blower 146 into the tempered air chase 204. Ductwork is attached to the tempered air chase in order to distribute the tempered air throughout the home. The tempered air chase 204, which runs the entire length of the unit 100, allows for multi-positional installation of ductwork.

In a recirculation air mode, the baffle 120 is positioned to block the fresh air passageway 114. This allows the recirculation air to flow from the recirculation air passageway 116 along flow path R through the unit 100. As can be seen, with the exception of flowing through the recirculation air passageway 116, the recirculated air flows along the same components that was described above with reference to the fresh air. This allows the filtering, dehumidifying, and sanitizing of indoor air on a continual recycling basis. In this mode, the exhaust blower 148 is normally turned off. The exhaust blower 148 can be turned on when a bathroom fan or some other type of exhaust fan is turned on inside the house.

Figure 8:
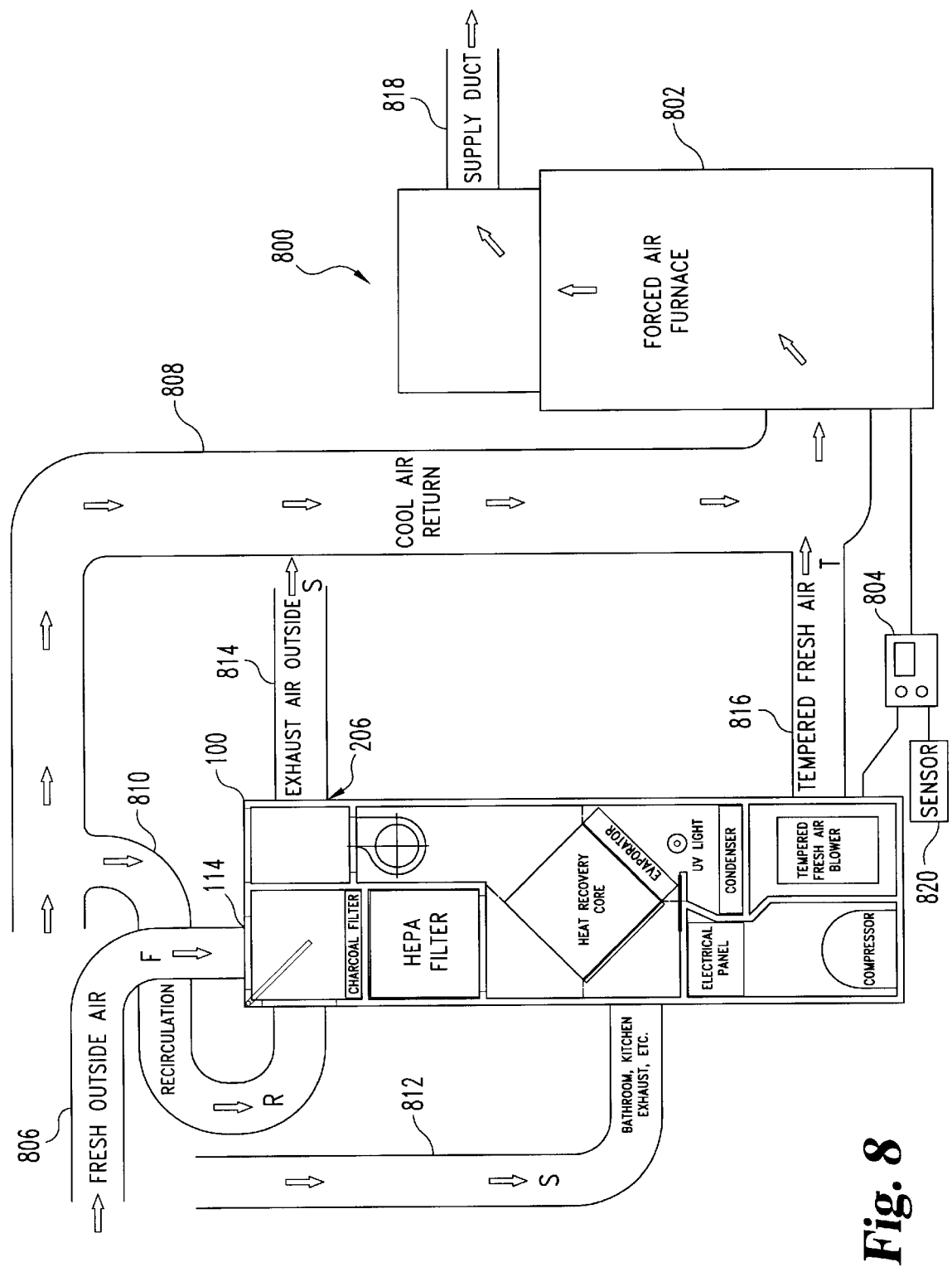
FIG. 8 shows a diagram illustrating ductwork used to attach the FIG. 1 unit to a forced air furnace having a blower that runs continuously.

An air treatment system 800 according to one embodiment of the present invention is illustrated in FIG. 8. In the illustrated embodiment, the system 800 includes the unit 100, a forced air furnace 802, and a controller 804 that is configured to sense air temperature and humidity conditions so as to control the furnace 802 along with the unit 100. As can be seen, housing the components of the unit 100 in a single, compact housing 102 makes installation easier by reducing the amount of required ductwork. In the illustrated embodiment, the forced air furnace 802 has a blower fan that runs continuously so as to recirculate air throughout the home. Fresh air supply duct 806 supplies air from outside the home to the unit 100 and is attached to the fresh-air port 114 of the unit 100. Return air duct 808 supplies return air to both the forced air furnace 802 and the air treatment unit 100. A recirculation air duct 810 offshoots from the return air duct 808 and is coupled to the unit 100 through recirculation air passageway 116. Stale air duct 812 supplies stale air, such as bathroom exhaust air, kitchen exhaust air and the like, to the stale air chase 202. As described above, the stale air chase 202 extends the entire length of the unit 100 such that the stale air duct 812 can be coupled at any position along the length of the unit 100. Exhaust duct 814 exhausts stale air from the unit 100 to the outside. Tempered air duct 816 resupplies tempered air to the return duct 808 which in turn is supplied to the forced air furnace 802. Supply duct 818 supplies treated air from the furnace 802 to the home.

Alternatively or additionally, the system 800 can include other types of air temperature control devices besides the furnace 802, such as air conditioning systems and heat pumps, to name a few. In the system 800, the unit 100 operates in a similar fashion as described above.

In another embodiment, as illustrated in FIG. 8, the controller 804 can be operatively coupled to pressure sensor 820 in order to monitor pressure inside the house. In one form, pressure sensor 820 includes a diaphragm type sensor. In an emergency negative pressure operational mode, the pressure sensor 820 senses negative air pressure within the house, and in response, the controller 804 activates the fresh air blower 146 in order to equalize the air pressure in the house. Some sources of negative air pressure in the house can be caused by exhaust fans for industrial grade ovens and fireplaces. For instance, the emergency negative pressure mode can be activated when a back draft is formed in a chimney by the homeowner trying to light a fire in the fireplace.

Figure 9:
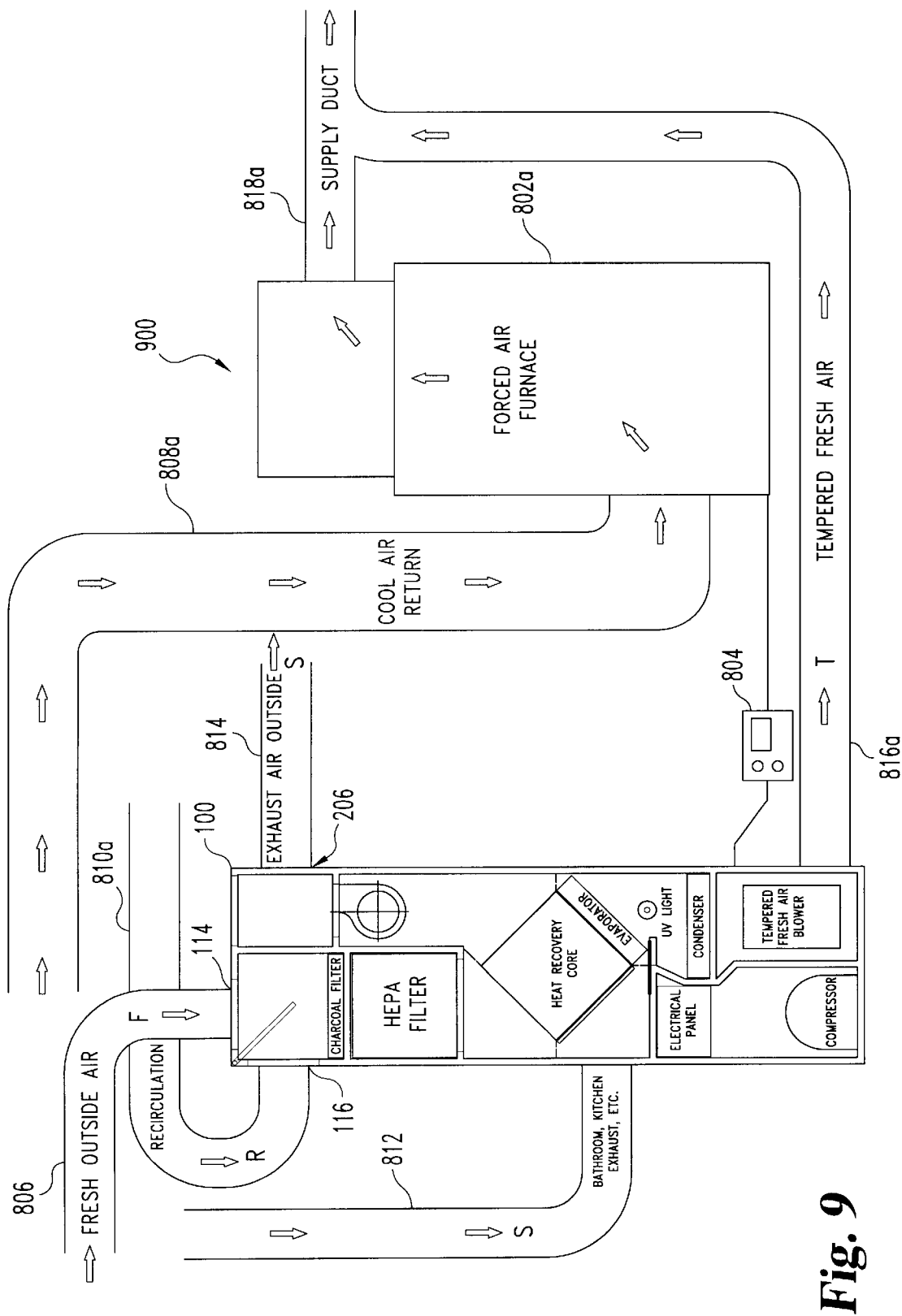
FIG. 9 shows the ductwork installation of the FIG. 1 unit when the forced air furnace is designed to run the blower intermittently.

An air treatment system 900 according to another embodiment of the present invention is illustrated in FIG. 9. Like the system 800 described above, system 900 includes the air treatment unit 100, a forced air furnace 802*a* and the controller 804. In the illustrated embodiment, the blower furnace 802*a* only blows air during heating or cooling, and when not operating, the furnace 802*a* does not blow any air through the home. Like the previous embodiment, the fresh air duct 806 supplies fresh air from outside the home to the unit 100 through the recirculation passageway 100. Recirculation duct 810*a* supplies air recirculated from the house to the unit 100. In the same manner as described above, the stale air duct 812 supplies stale air to the unit 100. Stale air is exhausted from the unit 100 through stale air exhaust duct 814, which exhausts the stale air outside the home. As shown, the tempered air duct 816*a* is not coupled to the return air duct 808*a*. Rather, the tempered air duct 816*a* is coupled to the supply duct 818*a*. This allows the unit 100 to be constantly running to supply fresh air, even when the forced air furnace 802*a* is not operating.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An air treatment system, comprising:
    a housing defining an interior cavity, said interior cavity having a supply-air flow path and a stale-air flow path;
    a high efficiency particulate air filter positioned in said interior cavity of said housing along said supply-air flow path to filter supply air;
    a heat recovery core positioned downstream from said high efficiency particulate air filter along said supply-air flow path, said heat recovery core being positioned in said interior cavity between said supply-air flow path and said stale-air flow path to exchange heat between said supply air and stale air;
    an evaporator positioned downstream from said heat recovery core along said supply-air flow path to remove heat from said supply air in order to dehumidify said supply air;
    an ultraviolet light positioned downstream from said evaporator along said supply-air flow path to irradiate said supply air with ultraviolet light; and a condenser positioned downstream from said ultraviolet light along said supply-air flow path to reintroduce said heat removed from said supply air by said evaporator.

2. The system of claim 1, wherein said housing defines a fresh air intake port to supply fresh air to said supply-air flow path.

3. The system of claim 2, wherein said housing defines a recirculation air intake port to supply recirculated air to said supply-air flow path.

4. The system of claim 3, further comprising a baffle provided along said supply-air flow path in said housing, said baffle being postionable to alternately close said fresh air intake port and said recirculation air intake port.

5. The system of claim 4, further comprising a motor coupled to said baffle to position said baffle.

6. The system of claim 1, further comprising a charcoal filter positioned upstream from said high efficiency particulate air filter along said supply-air flow path in said interior cavity to filter said supply air.

7. The system of claim 1, wherein said housing includes:
a stale-air chase positioned upstream from said heat recovery core along said stale-air flow path; and
a tempered-air chase positioned downstream from said condenser along said supply-air flow path.

8. The system of claim 7, wherein said stale-air chase and said tempered-air chase extend the entire length of one side of said housing for allowing flexibility in duct work attachment.

9. The system of claim 1, wherein said housing has a rectangular cross sectional shape.

10. The system of claim 1, further comprising a compressor positioned in said interior cavity of said housing, said compressor being operatively coupled to said evaporator and said condenser.

11. The system of claim 1, further comprising:
a supply air fan positioned in said interior cavity to move said supply air along said supply-air flow path; and
a stale air fan positioned in said interior cavity to move said stale air along said stale-air flow path.

12. The system of claim 11, wherein:
said supply air fan is positioned downstream from said condenser along said supply-air flow path; and
said stale air fan is positioned downstream from said heat recovery core along said stale-air flow path.

13. The system of claim 11, further comprising a controller operatively coupled to said supply air fan and said stale air fan to independently control said supply air fan and said stale air fan.

14. The system of claim 13, further comprising:
wherein said housing defines a fresh air intake port to supply fresh air to said supply-air flow path and a recirculation air intake port to supply recirculated air to said supply-air flow path; and
a motorized baffle provided along said supply-air flow path in said housing proximal said fresh air intake port and said recirculation air intake port, said motorized baffle being operatively coupled to said controller, wherein said baffle being positionable by said controller to alternately close said fresh air intake port and said recirculation air intake port.

15. The system of claim 1, further comprising an electrical panel positioned in said housing to supply electricity.

16. The system of claim 1, further comprising a drain pan positioned in said interior cavity below said evaporator to collect condensation from said evaporator.

17. The system of claim 1, wherein said high efficiency particulate air filter is constructed and arranged to filter particulates at least 0.3 microns in diameter with at least 99.97% efficiency.

18. The system of claim 1, wherein said ultraviolet light is positioned proximal said evaporator to irradiate said evaporator to minimize organism growth on said evaporator.

19. The system of claim 18, further comprising a drain pan positioned in said interior cavity below said evaporator to collect condensation from said evaporator, wherein said ultraviolet light is adapted to minimize organism growth in said evaporator.

20. The system of claim 1, further comprising:
a supply air blower positioned in said interior cavity to move said supply air along said supply-air flow path;
a controller operatively coupled to said supply air fan to control said supply air blower; and
a pressure sensor operatively coupled to said controller to sense air pressure in the building, wherein said controller upon sensing negative pressure in the building by said pressure sensor is operable to activate said supply air blower to compensate for the negative pressure.

21. The system of claim 1, wherein said high efficiency particulate air filter is positioned along said supply-air flow path upstream from said heat recovery core, said evaporator, said ultraviolet light, and said condenser to promote cleanliness of components in the air treatment system.

22. An air treatment system, comprising:
a housing defining an interior cavity, said interior cavity having a supply-air flow path and a stale-air flow path;
a high efficiency particulate air filter positioned in said interior cavity of said housing along said supply-air flow path to filter supply air;
a heat recovery core positioned downstream from said high efficiency particulate air filter along said supply-air flow path, said heat recovery core being positioned in said interior cavity between said supply-air flow path and said stale-air flow path to exchange heat between said supply air and stale air;
an evaporator positioned downstream from said heat recovery core along said supply-air flow path to remove heat from said supply air;
an ultraviolet light positioned downstream from said evaporator along said supply-air flow path to irradiate said supply air with ultraviolet light;
a condenser positioned downstream from said ultraviolet light along said supply-air flow path to reintroduce said heat removed from said supply air by said evaporator; and
a forced air furnace operatively coupled to said housing through ductwork.

23. The system of claim 22, wherein said ductwork includes:
a supply air duct to exhaust heated air from said furnace; and
a tempered air duct positioned downstream from said condenser along said supply-air flow path, said tempered air duct coupled to said supply air duct to supply said supply air to said supply air duct.

24. The system of claim 22, wherein said furnace is constructed and arranged to operate continuously.

25. An air treatment system, comprising:
a housing defining an interior cavity, said interior cavity having a supply-air flow path and a stale-air flow path;
said housing including a stale air chase for supplying stale air to said stale-air flow path;

said housing including a tempered air chase for exhausting supply air from said supply-air flow path, wherein said stale air chase and said tempered chase parallelly extend an entire length of one side of said housing;

said housing defining a fresh air intake and a recirculation air intake;

a baffle provided along said supply-air flow path in said housing, said baffle being positionable to alternately close said fresh air intake and said recirculation air intake;

a charcoal filter positioned downstream from said fresh air intake and said recirculation air intake along said supply-air flow path in said interior cavity to filter said supply air;

a high efficiency particulate air filter positioned downstream from said charcoal filter along said supply-air flow path to filter said supply air;

a heat recovery core positioned downstream from said high efficiency particulate air filter along said supply-air flow path, said heat recovery core being positioned between said supply-air flow path and said stale air flow path to exchange heat between said supply air and said stale air;

an evaporator positioned downstream from said heat recovery core along said supply-air flow path to cool said supply air;

a drain pan positioned in said interior cavity to collect condensation from said evaporator;

an ultraviolet light positioned downstream from said evaporator along said supply-air flow path to irradiate said supply air with ultraviolet light;

a condenser positioned downstream from said ultraviolet light along said supply-air flow path to heat said supply air;

a supply air fan positioned downstream from said condenser along said supply-air flow path to exhaust said supply air into said tempered chase;

a stale air fan positioned downstream from said heat recovery core along said stale air flow path to move said stale air;

a compressor positioned in said interior cavity of said housing, said compressor being operatively coupled to said evaporator and said condenser; and an electrical panel positioned in said housing to supply electricity to the system.

* * * * *